Patented May 1, 1928.

1,667,839

UNITED STATES PATENT OFFICE.

GUY H. BUCHANAN, OF WESTFIELD, AND COURTLAND M. HULINGS, OF ELIZABETH, NEW JERSEY, ASSIGNORS TO AMERICAN CYANAMID COMPANY, OF NEW YORK, N. Y., A CORPORATION OF MAINE.

PROCESS OF PRODUCING POTASSIUM FERROCYANIDE.

No Drawing.  Application filed March 27, 1924.  Serial No. 702,424.

This invention relates to a process of producing potassium ferro-cyanide from a crude cyanide derived from lime nitrogen or commercial crude calcium cyanamid, and has for its object to improve the procedures heretofore proposed.

With this and other objects in view the invention consists in the novel steps and combinations of steps constituting the process all as will be more fully hereinafter disclosed and particularly pointed out in the claims.

In order that the invention may be the better understood it is said:—It is well known in the art that when a solution of ferrous sulfate is treated with the sodium cyanide of commerce, of say 96% to 98% purity, sodium ferrocyanide is formed. It is further well known that when sodium ferrocyanide is treated with a calcium salt and a potassium salt, such as calcium chloride and potassium chloride respectively, there is formed the double salt of potassium and calcium ferrocyanide. This double salt is relatively insoluble and may be recovered by filtration. It is also known that this double salt may be decomposed with potassium carbonate to form calcium carbonate and potassium ferrocyanide. These two salts may then be separated by a filtration and potassium ferrocyanide may be removed from the solution by crystallization.

We have found, however, that this method is not applicable when applied to a crude cyanide derived from lime nitrogen. That is, we have discovered that the composition of a crude cyanide of this character is such, that, one obtains calcium ferro-cyanide by treatment of the crude cyanide with ferrous sulfate without the necessity of adding a calcium salt as in the above method. The crude cyanide on the other hand contains numerous impurities which make the remaining steps more complicated than the ones which comprise the methods in use on the so-called 96-98% grade of cyanide above mentioned. We have found, however, that a pure or substantially pure potassium ferrocyanide product can be obtained, as will be hereinafter pointed out from such an impure cyanide as that made from lime nitrogen or such as cyanide as that described and claimed by Landis in U. S. Letters Patent No. 1,359,257.

In carrying out this new and improved process we may prepare a solution of ferrous sulfate in water in the proportion of say from 1 to 5 or 1 to 6, and add thereto said crude calcium cyanide in a steady stream and in an amount which will supply sufficient cyanide to react with the ferrous sulfate used.

As an example of the proportion of materials that we may use the following is given: 200 pounds of ferrous sulfate, 400 pounds of crude calcium cyanide and 1000 pounds of water. The rate at which the solid material is added depends largely on the size of the tank and the efficiency of the agitation. The rate of addition, however, is usually chosen so that the mixture does not boil over, and so that the reaction may be complete when the last portion of the said crude cyanide is stirred in. The temperature of the mixture rises automatically nearly to the boiling point and we may, if necessary, heat and agitate the mixture until substantially all the cyanide is converted into ferrocyanide.

We next filter the solution and obtain an impure filtrate containing salts of hydroferrocyanic acid, salts of calcium, salts of sodium, and salts of hydrochloric acid and other impurities.

We next treat this filtrate or impure solution preferably with solid potassium chloride and we may use for this purpose commercial muriate of potash or potassium chloride. We prefer to proportion the quantity of potassium chloride added so that there will be present in the solution an excess of combined potassium of from 5% to 40% over the amount required to react with the ferrocyanide in the solution so as to precipitate the latter as the relatively insoluble double salt of potassium and calcium ferrocyanide. That is to say, one may determine the ferrocyanide content of the solution by any well known analytical method, and one may assume that two molecules of potassium chloride is the theoretical amount required to react with each ferrocyanide ion present in the solution. Under such conditions we have discovered that if one adds an excess of potassium chloride of from 5% to 40% over that theoretically required as determined by said analytical method he has added sufficient potassium chloride to precipitate in an insoluble form substantially all the soluble ferrocyanide in our solution.

We prefer to heat and agitate the solution during the addition of the potassium chloride, and as soon as all of the latter has been added we bring the solution to boiling and then boil and agitate the mixture until substantially all the ferrocyanide has been precipitated.

We next filter the mixture and treat the cake with an amount of water sufficient to give us eventually, at a later stage in the process, a 25% solution of potassium ferrocyanide. We now agitate the mixture thoroughly and add solid potassium carbonate in an amount approximately one third of the weight of the wet cake used. We next heat the mixture to boiling, continue the agitation, and add solid potassium carbonate, until a side test shows that the mixture contains sufficient soluble carbonate to give a perceptible effervescence when a filtered portion is treated with a few drops of hydrochloric acid. After we find by this test we have added an excess of potassium carbonate we continue the boiling, preferably for 30 minutes and then filter the mixture.

We now have a solution of potassium ferrocyanide which we concentrate if necessary and remove a crop of high grade crystals. The mother liquor is returned to the evaporator for further concentration. The crystals secured are of exceptional purity. The mother liquors of our process are also of high purity and may be returned to the process indefinitely.

In carrying out this process we have found it desirable as before stated to use commercial potassium muriate KCl. This material, is, however, apt to contain impurities such as will contaminate the mother liquors and prevent our returning them to the process indefinitely. One such impurity consists of sulfates. We have found, however, that so long as the crystallization liquor does not contain in excess of 2.8% potassium sulfate, the crystals of potassium ferrocyanide will not be contaminated. But, when the percentage of sulfates goes higher than this figure, they represent a source of contamination and must be removed from the mother liquors before the latter can be returned to the process.

The removal of these soluble sulfates by any of the present procedures as by purification with barium chloride $Ba Cl_2$ has the disadvantage than an expensive reagent must be purchased.

We have discovered, however, that if we treat these contaminated mother liquors with the correct amount of crude ferrocyanide liquor, from a previous step in our process, we can remove the objectionable sulfates and perform the entire purification in the apparatus of the process. In carrying out the purification we proceed as follows:—We add the contaminated mother liquor to a predetermined quantity of crude ferrocyanide solution, such as the filtered liquor from the reaction of the ferrous sulfate and the crude calcium cyanide. We choose a quantity of the said crude ferrocyanide liquor such that it will contain an excess of calcium ferrocyanide over the amount required to react with all the soluble potassium in the mother liquor to form the insoluble double salt of potassium and calcium ferrocyanide. To this mixture we then add sufficient muriate of potash KCl to precipitate the excess of soluble calcium ferrocyanide which was purposely used in the first instance. We now have a mixture which contains ferrocyanide in the form of the insoluble double salt, and sulphate as calcium sulfate. We filter the mixture and recover a cake containing said double salt and said sulfate. We next treat this cake with just sufficient potassium carbonate to react with said double salt to decompose it and form soluble potassium ferrocyanide but not enough to react with any of the calcium sulfate. We now have a potassium ferrocyanide solution contaminated with an insoluble sulfate. We remove the sulfate by filtration and secure a solution from which potassium ferrocyanide crystals may be recovered without danger of contamination by sulfates.

What is claimed is:—

1. The process of purifying a ferrocyanide mother liquor which comprises treating said mother liquor with calcium ferrocyanide in excess; adding commercial potassium chloride; removing the insoluble constituents from the solution; treating the insoluble constituents with an amount of potassium carbonate sufficient to decompose any double salt of potassium and calcium ferrocyanide present, but insufficient to react with any calcium sulfate present; filtering said solution; and removing potassium ferrocyanide from said solution.

2. The step in the process of producing potassium ferrocyanide which comprises adding to a mixture of calcium potassium ferrocyanide and calcium sulfate an amount of potassium carbonate sufficient to react with the calcium potassium ferrocyanide content of said mixture but insufficient to react with the calcium sulphate present.

In testimony whereof we affix our signatures.

GUY H. BUCHANAN.
COURTLAND M. HULINGS.